United States Patent
Tsai

(10) Patent No.: US 8,727,560 B2
(45) Date of Patent: May 20, 2014

(54) WIND-POWERED LIGHT-EMITTING DIODE LAMP

(75) Inventor: Jing-Hong Tsai, New Taipei (TW)

(73) Assignee: Zhe Jiang Hong Zhu Plastic & Hardware Co., Ltd., Jiashan, Zhejiang (CN)

( * ) Notice: Subject to any disclaimer, the term of this patent is extended or adjusted under 35 U.S.C. 154(b) by 161 days.

(21) Appl. No.: 13/590,646

(22) Filed: Aug. 21, 2012

(65) Prior Publication Data

US 2013/0235567 A1 Sep. 12, 2013

(30) Foreign Application Priority Data

Mar. 10, 2012 (CN) .......................... 2012 2 0093060

(51) Int. Cl.
*F21L 13/02* (2006.01)
*F03D 9/02* (2006.01)
*F03D 9/00* (2006.01)
*F21S 9/02* (2006.01)
*F21S 9/04* (2006.01)

(52) U.S. Cl.
CPC . *F21L 13/02* (2013.01); *F03D 9/02* (2013.01); *F03D 9/002* (2013.01); *F21S 9/026* (2013.01); *F21S 9/043* (2013.01)
USPC ................... 362/192; 362/96; 290/44; 290/55

(58) Field of Classification Search
CPC ............ F21L 13/02; F03D 9/02; F03D 9/002; F03D 3/02; F21S 9/043; F21S 9/026; Y02E 10/72

USPC ......... 362/96, 192; 290/43, 44, 54, 55; 416/5; 417/360
See application file for complete search history.

(56) References Cited

U.S. PATENT DOCUMENTS

| | | | |
|---|---|---|---|
| 6,086,214 A * | 7/2000 | Ridge | 362/96 |
| 6,398,381 B1 * | 6/2002 | Tseng | 362/96 |
| 6,588,913 B1 * | 7/2003 | Huang | 362/96 |
| 6,923,552 B2 * | 8/2005 | Tseng | 362/192 |
| 7,841,732 B2 * | 11/2010 | Coushaine et al. | 362/96 |
| 8,109,645 B2 * | 2/2012 | Liao | 362/192 |
| 8,403,520 B2 * | 3/2013 | Liao et al. | 362/192 |
| 2003/0147238 A1 * | 8/2003 | Allen et al. | 362/192 |
| 2006/0187657 A1 * | 8/2006 | Lin | 362/192 |

* cited by examiner

Primary Examiner — Alan Cariaso
(74) Attorney, Agent, or Firm — Rabin & Berdo, P.C.

(57) ABSTRACT

A wind-powered lamp includes lower and upper covers confining a space and having inlet and outlet holes, a reflective casing disposed in the space to extend outward from the inlet hole in the lower cover, a lamp plate affixed to the reflective casing, a fixing frame, a power generating motor, a rotor and a storage battery. The upper and lower covers respectively have an open end defining inlet and out holes, an inner sidewall extending inwardly from the open end. The motor fixing frame has engaging ribs engaging with slots formed on inner side wall to affix the motor fixing frame. The power generating motor is affixed within the fixing frame such that a motor shaft passes through a shaft hole in the fixing frame to connect with the rotor. The power generating motor, the storage battery and the lamp plate are serially and electrically connected to one another.

6 Claims, 7 Drawing Sheets

WIND-POWERED LIGHT-EMITTING DIODE LAMP

BACKGROUND OF THE INVENTION

1. Field of the Invention

The present invention relates to a small wind-powered illuminating lamp, and more particularly to a wind-powered light-emitting diode (LED) lamp.

2. The Prior Arts

Wind power is a sustainable energy source that can be used to generate electricity, and implemented as a solution to the lack of energy.

Current outdoor lamps and handheld lamps are usually and manually agitated, using solar power, or electrically chargeable to provide power for illumination. However, these lamps are not convenient to operate and expensive to manufacture.

SUMMARY OF THE INVENTION

A primary objective of the present invention is to provide a wind-powered LED lamp that is simple in structure, and easy to use.

To achieve at least the aforementioned objectives, the wind-powered LED lamp of the present invention includes a lower cover, a reflective casing, an LED lamp plate and an upper cover. The lower cover has an outer surface formed with a vent inlet hole therethrough and a plurality of mount holes for assembling the reflective casing. The mount holes are located at two sides of the vent inlet hole, and the reflective casing is assembled through an interior of the mount holes and extends outward from the lower cover. The LED lamp plate is assembled in the lower cover and affixed with the reflective casing. The upper cover has an outer surface formed with a vent outlet hole. The upper cover and the lower cover are assembled to define an interior space, in which are placed a motor fixing frame, a power generating motor, a rotor provided with blades, and a storage battery. The upper and lower covers respectively have an open end defining a respective one of the vent inlet and out holes, an inner sidewall extending from the open end and are provided with slots. The motor fixing frame has engaging ribs formed at the periphery thereof for engaging with the slots to affix the motor fixing frame. The motor fixing frame further has a shaft hole and a flow hole. The power generating motor is affixed within the motor fixing frame in such a manner that the motor shaft passes through the shaft hole to connect with the rotor. The power generating motor, the storage battery and the LED lamp plate are serially and electrically connected to one another.

The vent inlet hole of the wind-powered LED lamp can be conveniently connected with most inflating pumps currently available on the market. Air can enter the lamp through the vent inlet hole of the lower cover to drive the rotor in rotation, which, in turn, drives the power generating motor in rotation to produce electricity that is stored in the storage battery. The used structure is simple and can more efficiently generate power.

The switch is serially connected between the storage battery and the LED lamp plate, and two tubes are connected between the power generating motor and the storage battery. It can be thereby ensured that power stored in the storage battery cannot leak toward the power generating motor. The switch is mounted through a mount slot provided at the open end of the lower cover. With the above assembly, the lamp can be operated with ease.

An outer surface of the upper cover can also be provided with symmetrical engaging openings for pivotally connected with two ends of a pull ring so that the lamp can be used as a suspended lamp.

A portion of the reflective casing extends outward from the lower cover and is covered by a transparent lamp lid for protecting the LED lamp plate in the reflective casing.

The vent inlet hole of the wind-powered LED lamp can be conveniently connected with most inflating pumps currently available on the market. Air can enter the lamp through the vent inlet hole of the lower cover to drive the rotor in rotation, which in turn drives the power generating motor in rotation to produce electricity that is stored in the storage battery. The used structure is simple and can more efficiently generate power. Moreover, the vent outlet hole of the upper cover can be connected with an external body that needs to be inflated, so that the body can be inflated and power can be generated simultaneously. Time thus can be saved. Moreover, the present invention can be used repeatedly, which can save energy resource and protect the environment.

BRIEF DESCRIPTION OF THE DRAWINGS

The present invention will be apparent to those skilled in the art by reading the following detailed description of preferred embodiment thereof, with reference to the attached drawings, in which.

DETAILED DESCRIPTION OF THE PREFERRED EMBODIMENTS

Embodiment 1

Figure 1:
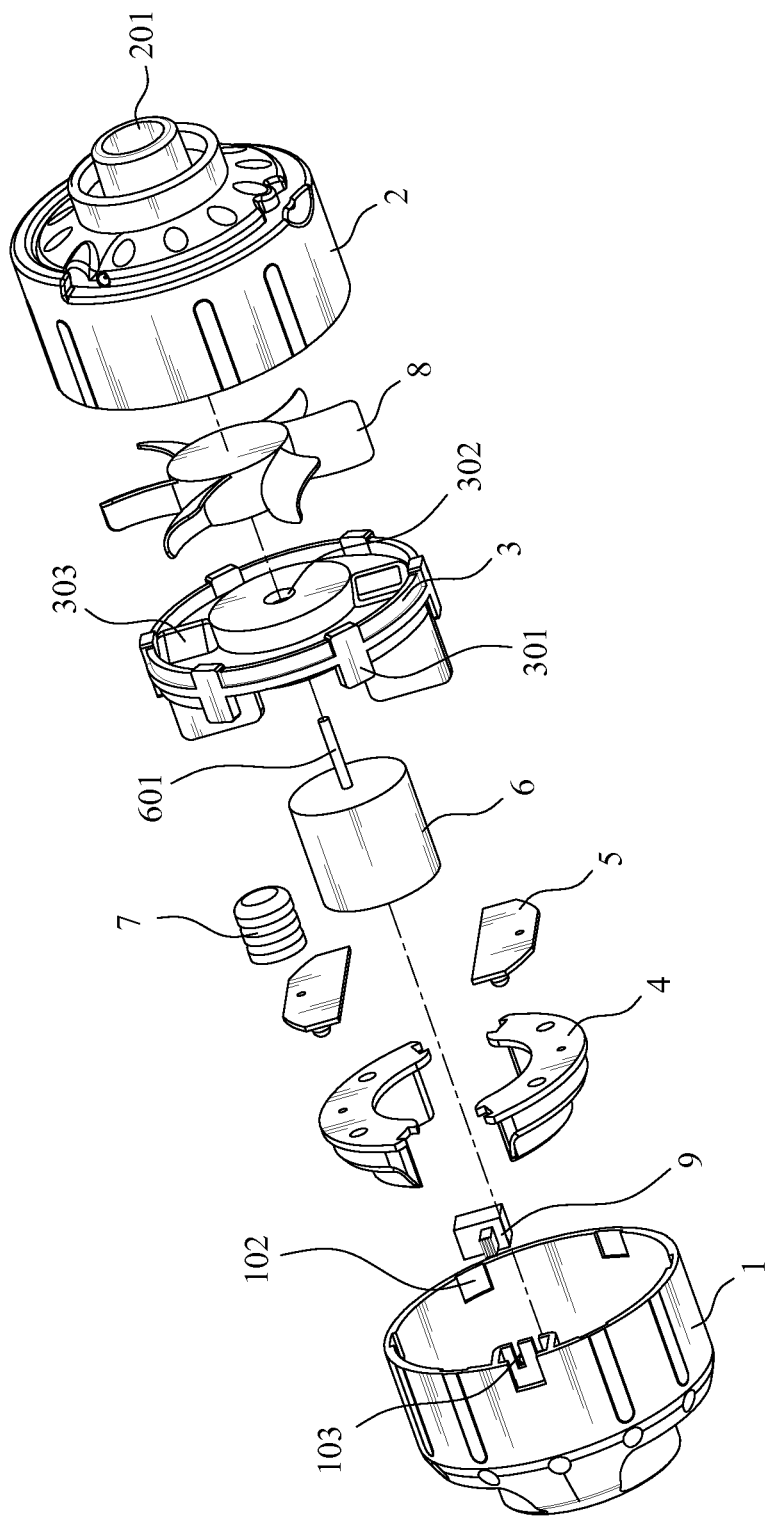
FIG. 1 is an exploded view showing the first embodiment of a wind-powered LED lamp of the present invention.
Figure 2:
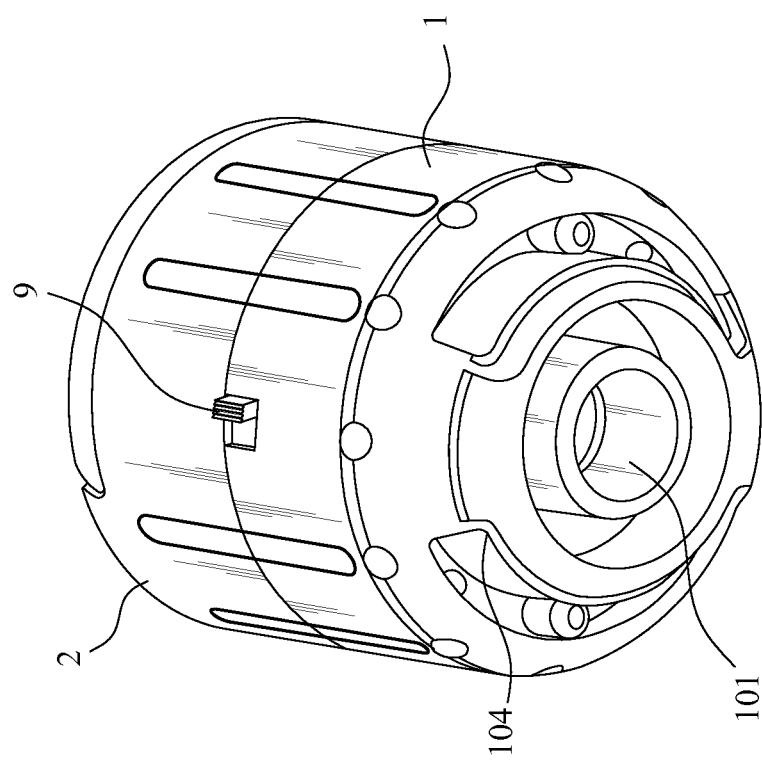
FIG. 2 is a perspective view showing the first embodiment of a wind-powered LED lamp of the present invention.

As shown in FIGS. 1 and 2, a wind-powered light-emitting diode (LED) lamp includes a lower cover 1, a reflective casing 4, an LED lamp plate 5 and an upper cover 2. The lower cover 1 has an outer surface formed with a plurality of mount holes 104 for assembling the reflective casing 4, and a vent inlet hole 101 extending through the outer surface. The mount holes 104 are located at two sides of the vent inlet hole 101. The reflective casing 4 is assembled through an interior of the mount holes 104, and extends outward from the lower cover 1. The LED lamp plate 5 is assembled in the lower cover 1, and is affixed with the reflective casing 4. The upper cover 2 has an outer surface formed with a vent outlet hole 201. The upper cover 2 and the lower cover 1 are assembled to define an interior space, in which are placed a motor fixing frame 3, a power generating motor 6, a rotor 8 provided with blades, and a storage battery 7. The upper and lower covers 2 and 1 respectively have an open end defining a respective one of the vent inlet and out holes, and an inner sidewall extending from the open end and are formed with slots 102. The motor fixing frame 3 has engaging ribs 301 formed at the periphery thereof for engaging with the slots 102 so as to affix the motor fixing frame 3. The motor fixing frame 3 also has a shaft hole 302 and a flow hole 303. The power generating motor 6 is affixed with the motor fixing frame 3. The motor shaft 601 passes through the shaft hole 302 to connect with the rotor 8. The power generating motor 6, the storage battery 7 and the LED lamp plate 5 are sequentially connected with one another in series.

A switch 9 is serially connected between the power generating motor 6 and the storage battery 7. The opened end of the lower cover 1 has a mount slot 103 through which the switch 9 is assembled. With the above assembly, the lamp can be more easily to operate.

For assembling the lamp, the power generating motor 6 is affixed within the motor fixing frame 3, and the rotor 8 is fixedly assembled with the motor shaft 601. The power generating motor 6 then is connected with the storage battery 7. The LED lamp plate 5 is mounted in the reflective casing 4, and then is connected electrically with the storage battery 7. Eventually, the foregoing assembly can be installed in the lower and upper covers 1 and 2.

A fast air flow can enter the lamp through the lower cover 1, and pass through the flow hole 303 of the motor fixing frame 3. The flow hole 303 can be such that air traveling through the flow hole 303 will increase in speed and also are directed at a suitable incident angle onto the blades of the rotor 8. The rotor 8 in turn drives the power generating motor 6 in rotation to produce electricity, which is stored in the storage battery 7. The switch 9 can be operated to supply power to the LED lamp plate 5 for its illumination.

Figure 3:
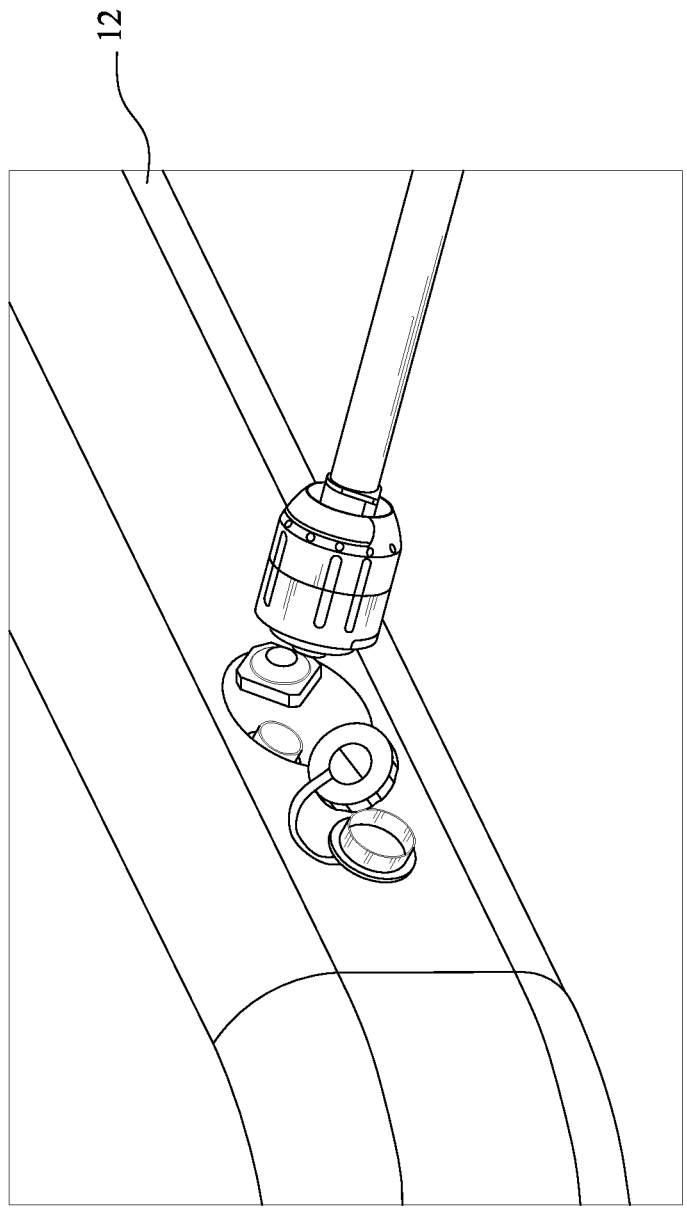
FIG. 3 is a schematic view showing the first embodiment of the wind-powered LED lamp of the present invention in application.

The vent inlet hole 101 of the wind-powered LED lamp can be conveniently connected with most inflating pumps currently available on the market. Air can enter the lamp through the vent inlet hole 101 of the lower cover 1 to drive the rotor 8 in rotation, which in turn drives the power generating motor 6 in rotation to produce electricity that is stored in the storage battery 7. The used structure is simple and can more efficiently generate power. As shown in FIG. 3, the vent outlet hole 201 of the upper cover 2 can be connected with an external body 12 that needs to be inflated, so that the body 12 can be inflated and power can be generated simultaneously. Time is thus saved. Moreover, the present invention can be used repeatedly, which can save energy resource and protect the environment.

Embodiment 2

Figure 4:
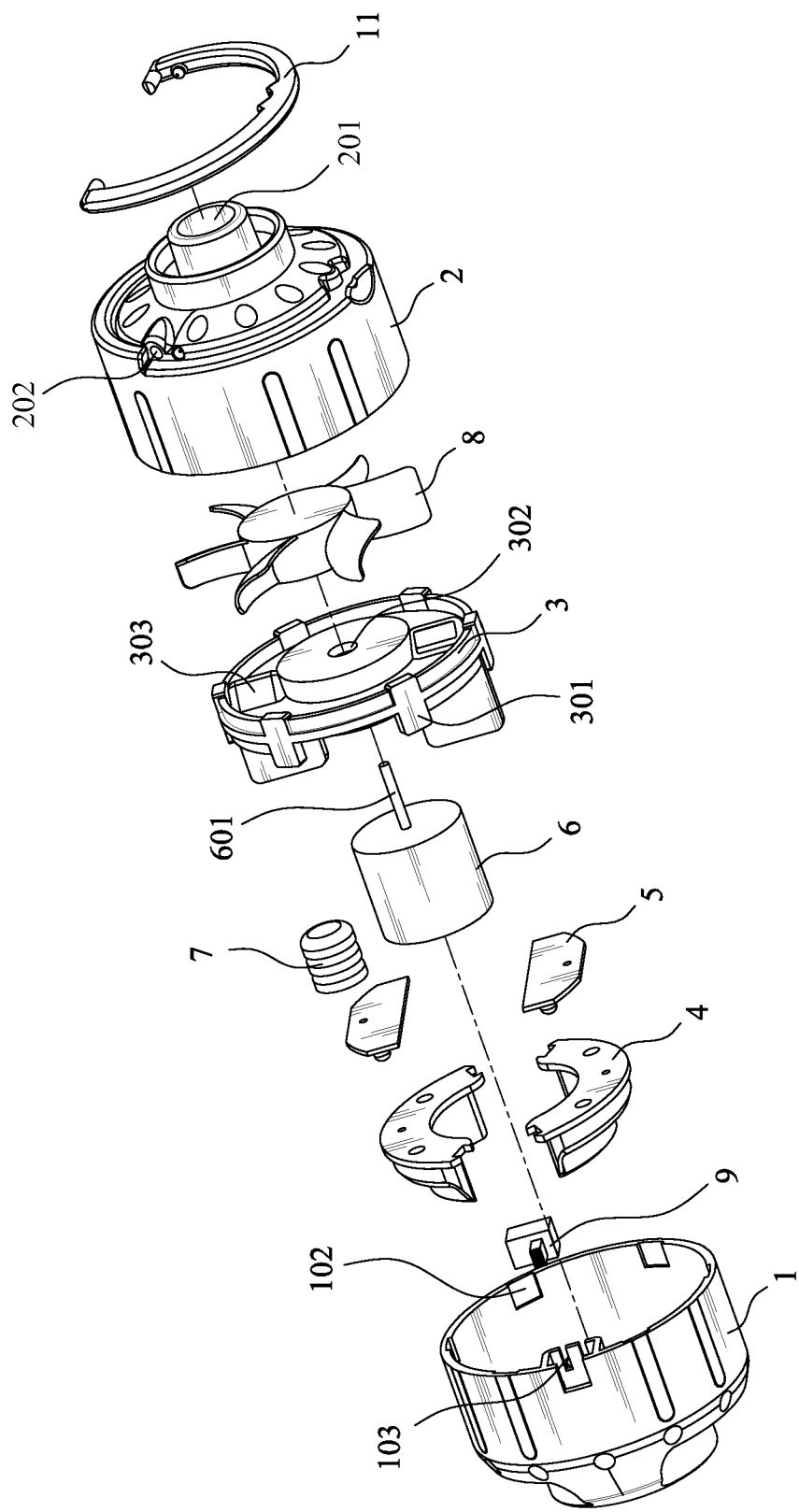
FIG. 4 is an exploded view showing the second embodiment of the wind-powered LED lamp of the present invention.
Figure 5:
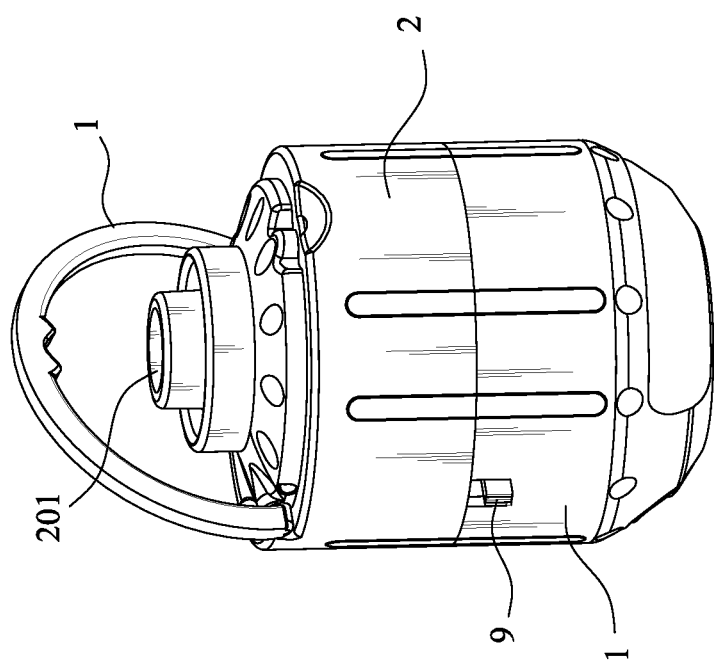
FIG. 5 is a perspective view showing the second embodiment of the wind-powered LED lamp of the present invention.

As shown in FIGS. 4 and 5, the wind-powered LED lamp is generally similar to the previous embodiment in structure. However, in order to use the lamp as a suspended lamp, the outer surface of the upper cover 2 is formed with symmetrical engaging openings 202 for pivotally connected with two ends of a pull ring 11.

Embodiment 3

Figure 6:
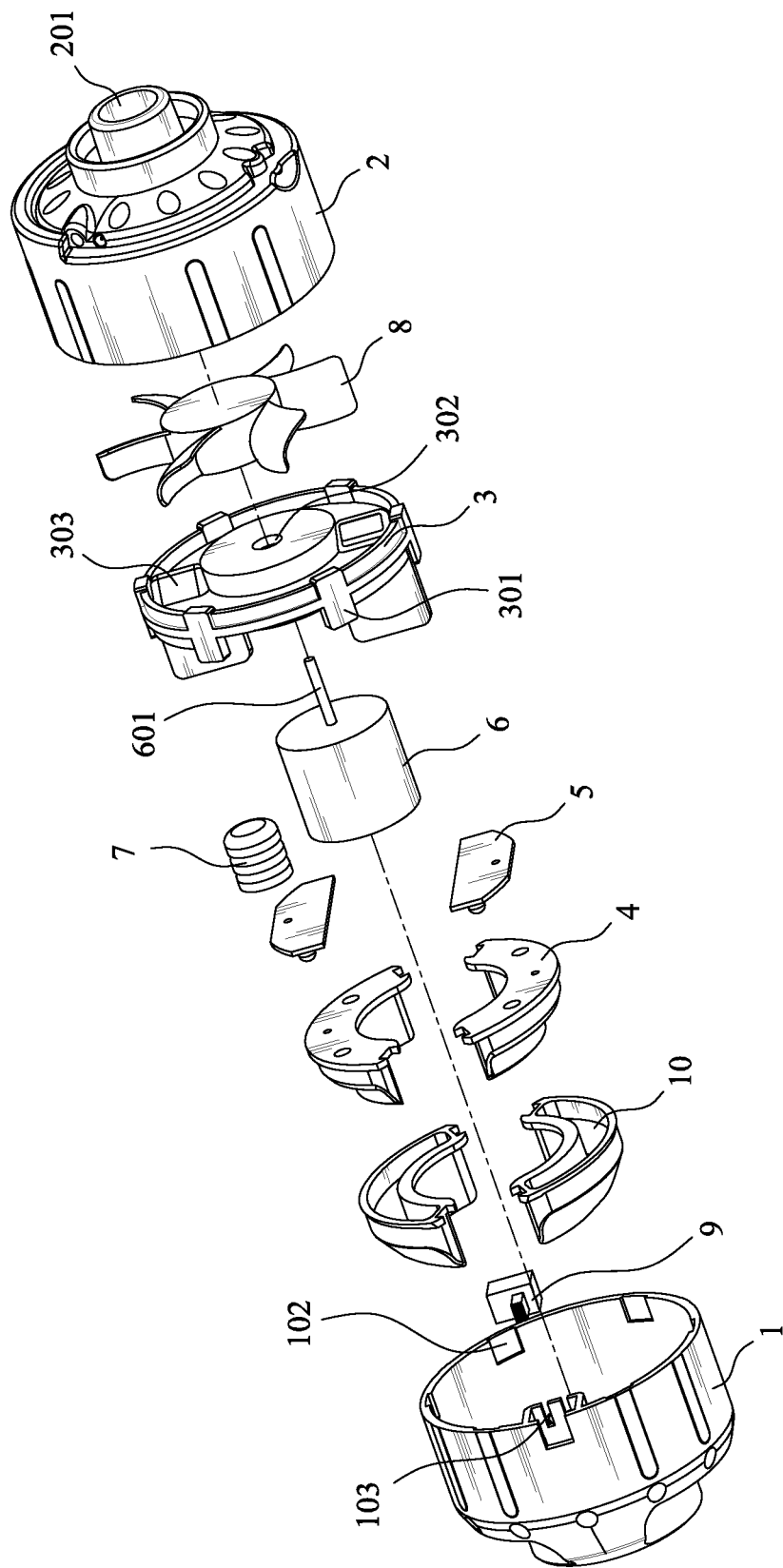
FIG. 6 is an exploded view showing the third embodiment of the wind-powered LED lamp of the present invention.
Figure 7:
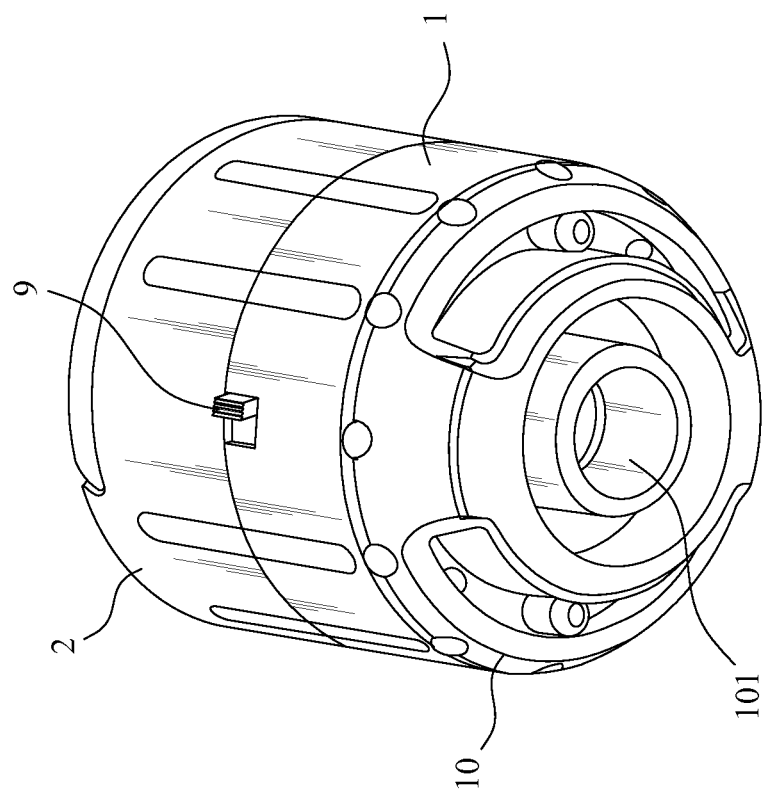
FIG. 7 is a perspective view showing the third embodiment of the wind-powered LED lamp of the present invention.

As shown in FIGS. 6 and 7, the wind-powered LED lamp is generally similar to the previous embodiment in structure. However, in this embodiment, a portion of the reflective casing 4 extending outward from the lower cover 1, is covered by a transparent lamp lid 10, which is used for protecting the LED lamp plate 5 in the reflective casing 4.

The foregoing description is intended to only provide illustrative ways of implementing the present invention, and should not be construed as limitations to the scope of the present invention. While the foregoing is directed to embodiments of the present invention, other and further embodiments of the invention may thus be devised without departing from the basic scope thereof, and the scope thereof is determined by the claims that follow.

What is claimed is:

1. A wind-powered LED lamp comprising;
   a reflective casing;
   a lower cover having an outer surface formed with a vent inlet hole therethrough and a plurality of mount holes, which are located at two sides of said vent inlet hole and which are used for assembling said reflective casing therein in such a manner that said reflective casing extends outwardly from said lower cover;
   an LED lamp plate disposed within said lower cover and affixed to said reflective casing;
   an upper cover having an outer surface formed with a vent outlet hole, said upper cover being assembled with said lower cover to define an interior space, in which are placed a motor fixing frame, a power generating motor, a rotor provided with blades, a storage battery and a switch;
   wherein, each of said upper and lower covers and having an open end defining a respective one of said vent inlet and out holes, an inner sidewall extending inwardly from said open end and provided with slots in such a manner that engaging ribs formed at a periphery of the motor fixing frame engaging with said slots in order to affix said motor fixing frame, said motor fixing frame having a shaft hole and a flow hole, said power generating motor being affixed to said motor fixing frame such that said motor shaft extends through said shaft hole to couple with said rotor such that said switch , said power generating motor, said storage battery and the LED lamp plate are electrically connected with one another.

2. The wind-powered LED lamp as claimed in claim 1, further comprising two tubes connecting said power generating motor with said storage battery, said switch being serially connected between said storage battery and said LED lamp plate, said switch further being mounted through a mount slot formed at an open end of said lower cover.

3. The wind-powered LED lamp as claimed in claim 1, wherein said outer surface of said upper cover is provided with symmetrical engaging openings for pivotally connected with two ends of a pull ring.

4. The wind-powered LED lamp as claimed in claim 2, wherein said outer surface of said upper cover is provided with symmetrical engaging openings for pivotally connected with two ends of a pull ring.

5. The wind-powered LED lamp as claimed in claim 3, wherein a portion of the reflective casing extends outward from said lower cover, the wind-powered LED lamp further comprising a transparent lamp lid covering said portion of said reflective casing for protection purpose.

6. The wind-powered LED lamp as claimed in claim 4, wherein a portion of the reflective casing extends outward from said lower cover, the wind-powered LED lamp further comprising a transparent lamp lid covering said portion of said reflective casing for protection purpose.

\* \* \* \* \*